(12) United States Patent
Kikuzawa

(10) Patent No.: US 12,479,146 B2
(45) Date of Patent: Nov. 25, 2025

(54) MOLD FOR EXTRUSION MOLDING FLEXIBLE TUBE AND FLEXIBLE TUBE PRODUCING APPARATUS

(71) Applicant: PLA GIKEN CO., LTD., Osaka (JP)

(72) Inventor: Yoshiharu Kikuzawa, Osaka (JP)

(73) Assignee: PLA GIKEN CO., LTD., Osaka (JP)

( * ) Notice: Subject to any disclaimer, the term of this patent is extended or adjusted under 35 U.S.C. 154(b) by 188 days.

(21) Appl. No.: 18/239,228

(22) Filed: Aug. 29, 2023

(65) Prior Publication Data

US 2024/0075670 A1    Mar. 7, 2024

(30) Foreign Application Priority Data

Sep. 6, 2022    (JP) ................. 2022-141604

(51) Int. Cl.
*B29C 48/335*    (2019.01)
*B29C 48/10*    (2019.01)
*B29C 48/21*    (2019.01)

(52) U.S. Cl.
CPC .......... *B29C 48/3363* (2019.02); *B29C 48/10* (2019.02); *B29C 48/21* (2019.02)

(58) Field of Classification Search
CPC ....... B29C 48/09; B29C 48/10; B29C 48/151; B29C 48/154; B29C 48/18; B29C 48/19; B29C 48/21; B29C 48/2552; B29C 48/2556; B29C 48/32; B29C 48/335; B29C 48/3363; B29C 48/34; B29C 48/49; B29C 48/92; B29C 2948/926; B29C 2948/92876; B29C 2948/92904
See application file for complete search history.

(56) References Cited

U.S. PATENT DOCUMENTS

| | | | | |
|---|---|---|---|---|
| 2,820,249 | A | * | 1/1958 | Colombo ................ B21C 23/22 118/302 |
| 6,634,878 | B1 | * | 10/2003 | Yanagawa ............... B29C 48/06 425/382.4 |
| 2005/0003034 | A1 | | 1/2005 | Watanabe et al. |
| 2007/0243282 | A1 | | 10/2007 | Kikusawa |

FOREIGN PATENT DOCUMENTS

| | | |
|---|---|---|
| CN | 1964834 A | 5/2007 |
| JP | 2002-180633 A | 6/2002 |
| JP | 4125843 B | 7/2008 |
| JP | 2011058605 A | 3/2011 |
| WO | 01089802 A1 | 11/2001 |
| WO | 2005/120804 A1 | 12/2005 |

* cited by examiner

*Primary Examiner* — Xiao S Zhao
*Assistant Examiner* — Joseph S Leyson
(74) *Attorney, Agent, or Firm* — Renner, Otto, Boisselle & Sklar, LLP

(57) ABSTRACT

Provided is a mold capable of shortening the length of a part mixed with resin before and after switching when switching the resin to be extruded onto the surface of a braided wire, and a flexible tube producing apparatus using the same. The mold for extruding the flexible tube includes a linear through hole through which a braided wire inserted from one end is drawn out from the other end, a first resin supply path connected to the through hole and having a flow path parallel to a plane orthogonal to the central axis of the through hole, and a second resin supply path connected to the through hole on the one end side of the through hole relative to the connection point between the first resin supply path and the through hole, and having a flow path parallel to the plane.

4 Claims, 6 Drawing Sheets

MOLD FOR EXTRUSION MOLDING FLEXIBLE TUBE AND FLEXIBLE TUBE PRODUCING APPARATUS

BACKGROUND

Field

The present invention relates to a mold for extrusion molding a flexible tube formed by coating the outer surface of a braided wire with a resin, and a flexible tube producing apparatus using the same.

Description of the Related Art

In medical institutions, tube-shaped medical instruments called catheters are used to inject drug solutions, contrast agents, etc. into predetermined sites in the living body of patients and to extract body fluids or the like in the living body. Since this catheter is inserted into the living body through a curved blood vessel, the distal end portion is required to be flexible so that it can be easily bent along the curved portion of the blood vessel without damaging the blood vessel. On the other hand, the portion of the catheter that is not inserted into the living body is required to have appropriate rigidity so that the catheter can be easily manipulated. However, some blood vessels have sharply curved portions, and there is a need for a catheter that can follow these sharply curved portions and bend at the boundary between the flexible portion and the hard portion.

For example, International Publication No. WO 2005/120804 describes a catheter molding apparatus in which an outer layer tube to be extrusion-molded onto a mesh layer is formed from two layers of a first resin and a second resin. In the catheter molding apparatus described in WO 2005/120804, by adjusting the ratio between the flow rate of the first resin extruded from a first extruder and the flow rate of the second resin extruded from a second extruder, it is possible to change the thickness ratio between the inner layer and the outer layer that configure the outer layer tube.

For example, it is conceivable to form an outer layer tube molded with a soft resin and an outer layer tube molded with a harder resin adjacent to each other, by using the catheter molding apparatus described in International Publication No. 2005/120804 and switching the supply of the first resin and the second resin.

However, even if the resin to be supplied to the mold is switched from the first resin to the second resin, the pressure remains in the first resin in the first resin flow path, so the supply of the first resin is not immediately stopped, and the first resin in the first resin flow path is continuously extruded. Further, it has been confirmed that the first resin remaining in the flow path of the first resin is pulled out by the second resin for a while after the extrusion of the second resin is started.

SUMMARY

The resin flow path must be provided along the entire circumference of the outer peripheral surface of a mold so that a resin can be simultaneously supplied to the entire circumference of the outer surface of a mesh layer. Since the mold in International Publication No. 2005/120804 has a conical shape (forward tapered shape), the volume of a resin flow path provided on the outer peripheral surface of the mold is large, and the amount of the first resin extruded after switching the resin increases. Therefore, with the molding apparatus described in WO 2005/120804, it is difficult to shorten the length of the portion molded with the mixed resin of the soft resin and the hard resin, and it is not suitable for producing a catheter that can be suddenly bent at the boundary between the soft resin and the hard resin.

Therefore, it is an object of the present invention to provide a mold capable of shortening the length of the resin-mixed portion before and after switching when switching the resin to be extruded onto the surface of a braided wire, and a flexible tube producing apparatus using the same.

The mold for extrusion molding a flexible tube according to the present invention includes a linear through hole through which a braided wire inserted from one end is drawn out from the other end, a first resin supply path connected to the through hole and having a flow path parallel to a plane orthogonal to the central axis of the through hole in a portion within a predetermined range from a connection point to the through hole, and a second resin supply path connected to the through hole on the one end side of the through hole relative to the connection point between the first resin supply path and the through hole, and having a flow path parallel to the plane in a portion within a predetermined range from a connection point to the through hole.

The flexible tube producing apparatus according to the present invention includes a mold, a first extruder that supplies a first resin to the mold, a second extruder that supplies a second resin different from the first resin to the mold, a first valve provided between the mold and the first extruder to control the supply of the first resin, and a second valve provided between the mold and the second extruder to control the supply of the second resin. The mold has a linear through hole through which a braided wire inserted from one end is drawn out from the other end, a first resin supply path connected to the through hole and having a flow path parallel to a plane orthogonal to the central axis of the through hole in a portion within a predetermined range from a connection point to the through hole, and a second resin supply path connected to the through hole on the one end side of the through hole relative to the connection point between the first resin supply path and the through hole, and having a flow path parallel to the plane in a portion within a predetermined range from a connection point to the through hole.

According to the present invention, it is possible to provide a mold capable of shortening the length of a portion where the resin is mixed before and after switching when switching the resin to be extruded onto the surface of a braided wire, and a flexible tube producing apparatus using the same.

These and other objects, features, aspects and effects of the present invention will become more apparent from the following detailed description referring to the accompanying drawings.

DETAILED DESCRIPTION

Embodiments of the present invention will be described below. In the following description, an example in which the present invention is applied to a producing apparatus of a flexible tube having a configuration in which a braid (mesh) is provided on the outer surface of an inner layer tube, which is a resin layer, and the braid is covered with an outer layer tube, which is a resin layer, will be described. An example of such a flexible tube is a catheter shaft. However, the catheter shaft is only one example of a flexible tube, and the present invention is also applicable to producing apparatuses of flexible tubes for other uses such as flexible tubes used in endoscopes, and the like.

Figure 1:
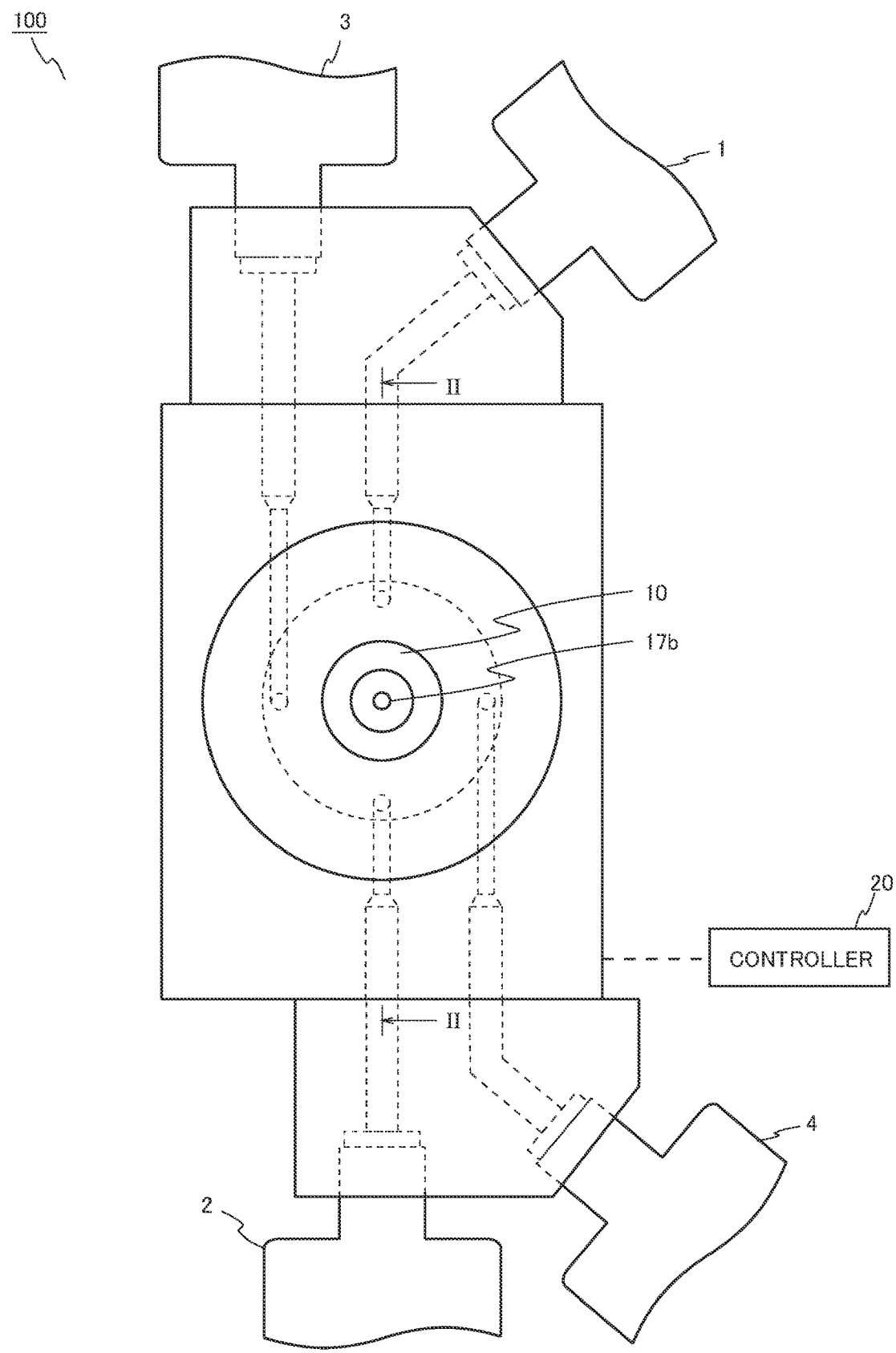
FIG. 1 is a top view showing a schematic configuration of a flexible tube producing apparatus according to an embodiment.
Figure 2:
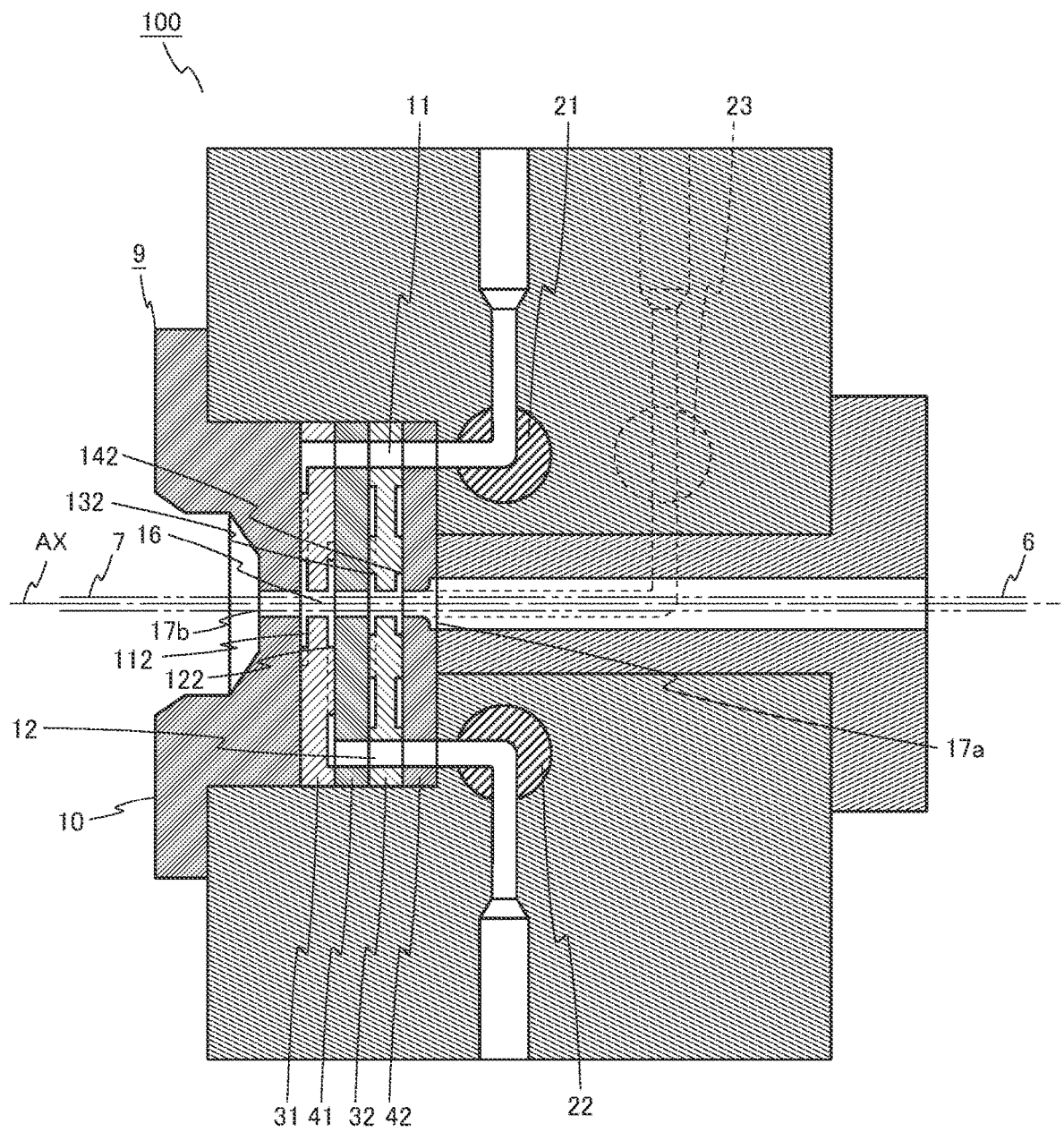
FIG. 2 is a cross-sectional view seen from the II-II line shown in FIG. 1.
Figures 3A, 3B:
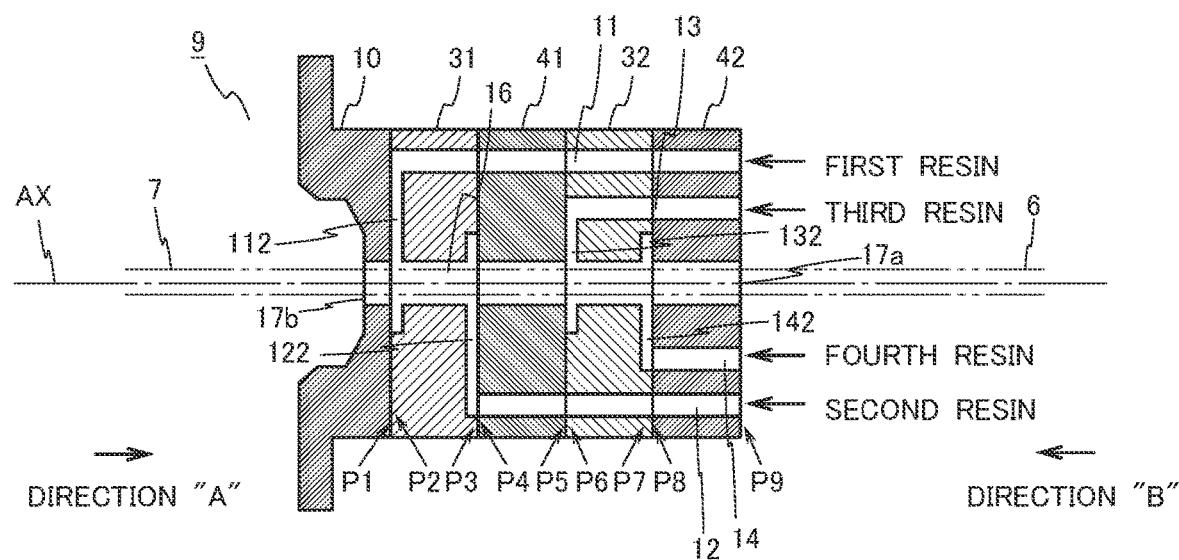
FIG. 3A is a schematic view of a mold according to an embodiment.
FIG. 3B is a schematic view of a flexible tube according to an embodiment.

FIG. 1 is a top view showing a schematic configuration of a flexible tube producing apparatus according to an embodiment, FIG. 2 is a cross-sectional view seen from the II-II line shown in FIG. 1, FIG. 3A is a schematic view of a mold of an embodiment, and FIG. 3B is a schematic view of a flexible tube according to an embodiment. In FIG. 3A, the rotational position of each member is different from the actual configuration for simplification of illustration.

A flexible tube producing apparatus 100 is an apparatus for extrusion molding a flexible tube 7 using a resin, and includes a mold 9, a first extruder 1, a second extruder 2, a third extruder 3, a fourth extruder 4, a first valve 21, a second valve 22, a third valve 23, and a fourth valve (not shown). The flexible tube producing apparatus 100 is fixed on a predetermined mount or the like via a pedestal. Although not shown, a supply device for supplying a braided wire 6, a cooling device for cooling an flexible tube 7 extrusion-molded, a take-up device for taking over the flexible tube 7, and the like are appropriately provided on the upstream and downstream sides of the mold 9. The braided wire 6 is conveyed from the rear side to the front side of the flexible tube producing apparatus 100. The braided wire 6 is obtained by providing a braid (mesh) 27 on the outer surface of an inner layer tube 28 made of resin and inserting a core wire (guide wire) 29 into the hollow portion of the inner layer tube 28 (see FIG. 3B). The flexible tube 7 has an outer layer tube 26 provided on the surface of the braided wire 6, and the core wire 29 of the braided wire 6 can be extracted after forming the outer layer tube 26, to obtain a catheter shaft.

The mold 9 includes a linear through hole 16 through which the braided wire 6 inserted from the rear end 17a is drawn out from the front end 17b, a first resin supply path 11, a second resin supply path 12, a third resin supply path 13, and a fourth resin supply path 14. All of the first resin supply path 11, the second resin supply path 12, the third resin supply path 13 and the fourth resin supply path 14 are connected to the through holes 16. The first resin supply path 11, the second resin supply path 12, the third resin supply path 13, and the fourth resin supply path 14 are supplied with the first resin, the second resin, the third resin, and the fourth resin from the first extruder 1, the second extruder 2, the third extruder 3, and the fourth extruder, respectively. Details of the configuration of the mold 9 will be described later.

The first extruder 1, the second extruder 2, the third extruder 3 and the fourth extruder 4 are, for example, screw extruders, which melt the resin pellets and extrude them at a constant speed from the discharge port at the tip. A first resin, a second resin, a third resin and a fourth resin are supplied to the first extruder 1, the second extruder 2, the third extruder 3 and the fourth extruder 4, respectively. Typically, the first to fourth resins are resins with different hardnesses. However, when the supply to the mold 9 is switched in order of the first to fourth resins, the hardness of the resins before and after switching may be different, and two of the first to second resins may have the same hardness. Further, the hardness of the first to fourth resins does not necessarily increase (or decrease) in order of switching, and can be set according to the application site of the flexible tube 7. The molten resin extruded from the first extruder 1, the second extruder 2, the third extruder 3 and the fourth extruder 4 is supplied to the mold 9 through a first valve 21, a second valve 22, a third valve 23 and a fourth valve.

The first valve 21 is provided between the first extruder 1 and the first resin supply path 11 of the mold 9. The first valve 21 can switch between a state in which the first extruder 1 and the first resin supply path 11 are in communication and a state in which the communication between the first extruder 1 and the first resin supply path 11 is blocked. Similarly, the second valve 22 is provided between the second extruder 2 and the second resin supply path 12 of the mold 9. The second valve 22 can switch between a state in which the second extruder 2 and the second resin supply path 12 are in communication and a state in which the communication between the second extruder 2 and the second resin supply path 12 is blocked. The third valve 23 is provided between the third extruder 3 and the third resin supply path 13 of the mold 9. The third valve 23 can switch between a state in which the third extruder 3 and the third resin supply path 13 are in communication and a state in which the communication between the third extruder 3 and the third resin supply path 13 is blocked. Moreover, although not shown in FIGS. 1 and 2, the fourth valve is provided between the fourth extruder 4 and the fourth resin supply path 14 of the mold 9. The fourth valve can switch between a state in which the fourth extruder 4 and the fourth resin supply path 14 are in communication and a state in which the communication between the fourth extruder 4 and the fourth resin supply path 14 is blocked.

The first valve 21, the second valve 22, the third valve 23, and the fourth valve include, for example, a cylindrical valve body rotatable around a predetermined rotation axis, a case containing the valve body, and a driving device such as a motor for rotating the valve body, or the like. The valve body and the case are provided with a plurality of flow paths formed by grooves and through holes, and the connection state of the flow paths provided in the valve body and the case changes according to the rotational position of the valve body, and the extruder and the resin supply path can be controlled to be in a connected state and a state in which the communication between the extruder and the resin supply path is blocked. In a state where the first valve 21, the second valve 22, the third valve 23, and the fourth valve block the communication between the corresponding extruder and the corresponding resin supply path, it is preferable that the resin supplied from the corresponding extruder can be discharged (discarded) to the outside. With this configuration, it is possible to suppress fluctuations in the internal pressure of the resin supplied from each extruder to the valve, so that the resin can be stably supplied from each valve to the resin supply path of the mold 9. The configuration and arrangement of the first valve 21, the second valve 22, the third valve 23, and the fourth valve are not particularly limited as long as the above-described resin supply control can be performed.

The flexible tube producing apparatus 100 further includes a control device 20. The control device 20 includes a computer including a CPU, a memory, a storage device, a communication interface, etc., and is connected to the first extruder 1, the second extruder 2, the third extruder 3, the fourth extruder, the first valve 21, the second valve 22, the third valve 23 and the fourth valve via signal lines (not shown). The control device 20 controls the operation of each of these devices connected via signal lines. Further, the control device 20 may control various devices arranged upstream and downstream of the flexible tube producing apparatus 100.

Hereinafter, configuration examples of the mold 9 according to the present embodiment will be described in detail with reference to FIGS. 2 to 7B.

The mold 9 according to the present embodiment is configured by stacking the die 10, the first plate flange 31, the first spacer 41, the second plate flange 32, and the second spacer 42 in this order and integrating them with bolts or the like.

Figure 4A:
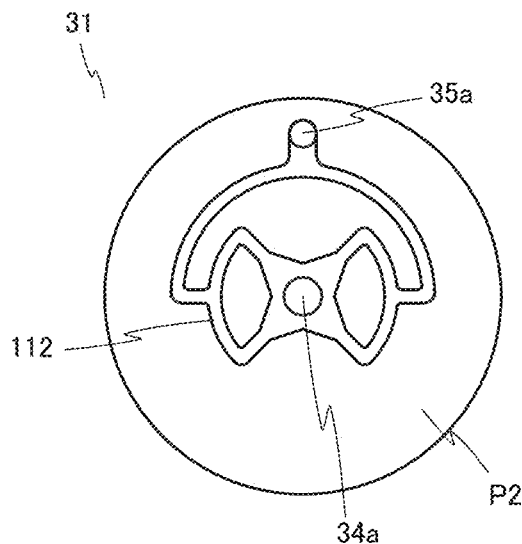
FIG. 4A is a plan view of a first plate flange shown in FIG. 2.
Figure 4B:
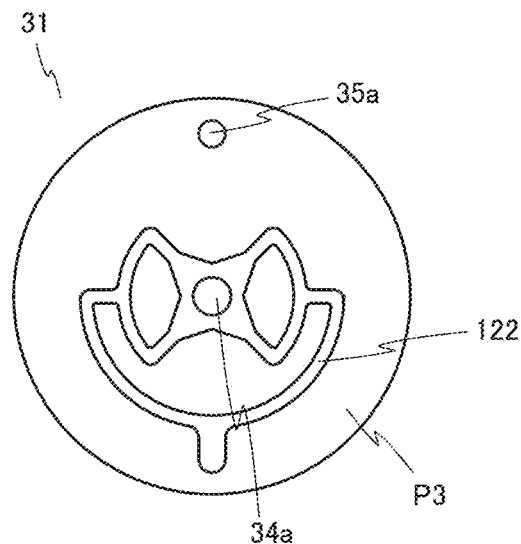
FIG. 4B is a plan view of a first plate flange shown in FIG. 2.
Figure 5A:
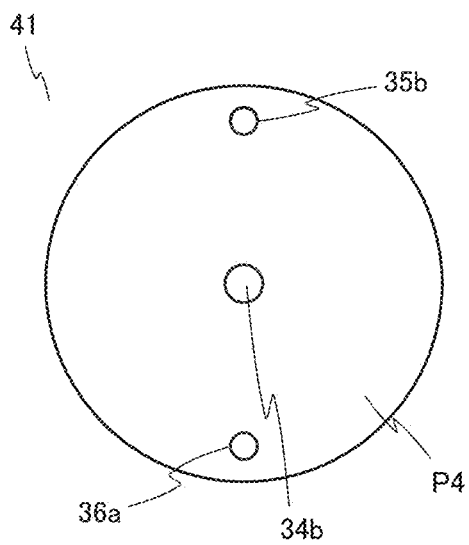
FIG. 5A is a plan view of a first spacer shown in FIG. 2.
Figure 5B:
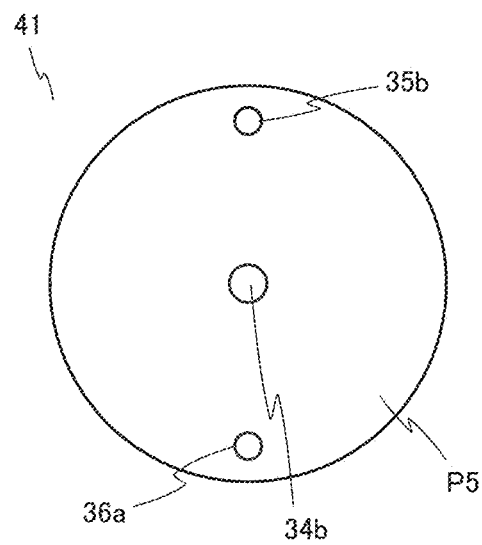
FIG. 5B is a plan view of a first spacer shown in FIG. 2.
Figure 6A:
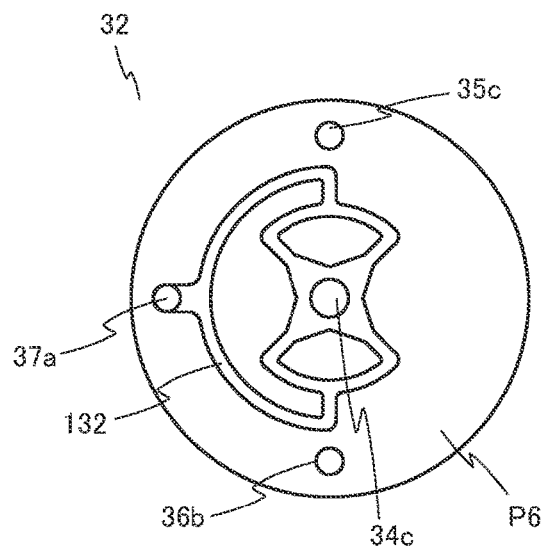
FIG. 6A is a plan view of a second plate flange shown in FIG. 2.
Figure 6B:
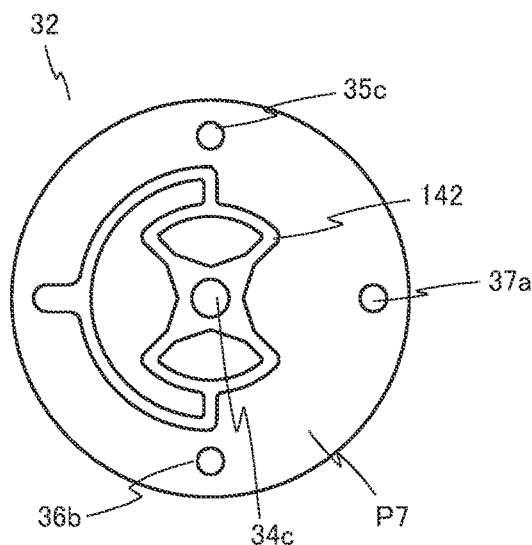
FIG. 6B is a plan view of a second plate flange shown in FIG. 2.
Figure 7A:
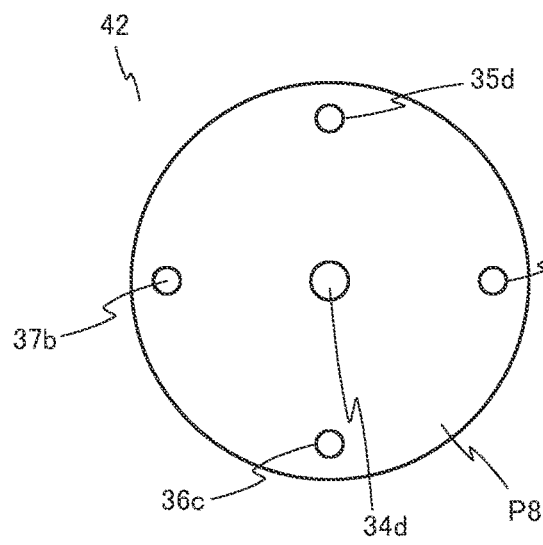
FIG. 7A is a plan view of a second spacer shown in FIG. 2.
Figure 7B:
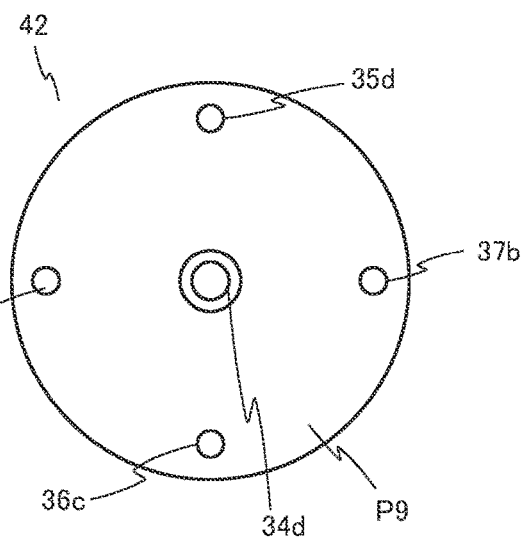
FIG. 7B is a plan view of a second spacer shown in FIG. 2.

FIGS. 4A and 4B are plan views of the first plate flange shown in FIG. 2, FIGS. 5A and 5B are plan views of the first spacer shown in FIG. 2, FIGS. 6A and 6B are plan views of the second plate flange shown in FIG. 2, and FIGS. 7A and 7B are plan view of the second spacer shown in FIG. 2. FIGS. 4A, 5A, 6A, and 7A correspond to the views seen from the direction "A" indicated by an arrow in FIG. 3A, and FIGS. 4B, 5B, 6B, and 7B correspond to the views seen from the direction "B" indicated by an arrow in FIG. 3A.

The die 10 has a through hole configuring an extrusion port (end portion 17b) for extruding the flexible tube 7 in the center, and a first flat surface P1 (see FIG. 3A) orthogonal to the central axis Ax of the through hole 16 on the end portion 17a side than the extrusion port (end portion 17b).

The first plate flange 31 is a flat member, and as shown in FIGS. 3A, 4A and 4B, has a second flat surface P2 in close contact with the first flat surface P1, and a third flat surface P3 parallel to the second flat surface P2. The first plate flange 31 has through holes 34a and 35a, a first groove 112 connected to the through holes 34a and 35a on the side of the second flat surface P2, and a second groove 122 connected to the through hole 34a on the side of the third flat surface P3.

The first spacer 41 is a flat member having the same outer shape as the first plate flange 31, and as shown in FIGS. 3A, 5A and 5B, it has a fourth flat surface P4 in close contact with the third flat surface P3 of the first plate flange 31, and a fifth flat surface P5 parallel to the fourth flat surface P4. Through holes 34b, 35b and 36a are formed in the first spacer 41.

The second plate flange 32 is a flat member having the same outer shape as the first plate flange 31, and as shown in FIGS. 3A, 6A and 6B, it has a sixth flat surface P6 in close contact with the fifth flat surface P5 of the first spacer 41, and a seventh flat surface P7 parallel to the sixth flat surface P6. The second plate flange 32 has through holes 34c, 35c, 36b and 37a, a third groove 132 connected to the through holes 34c and 37a on the side of the sixth flat surface P6, and a fourth groove 142 connected to the through hole 34c on the side of the seventh flat surface P7.

The second spacer 42 is a flat member having the same outer shape as the first plate flange 31, and as shown in FIGS. 3A, 7A and 7B, it has an eighth flat surface P8 in close contact with the seventh flat surface P7 of the second plate flange 32, and a ninth flat surface P9 parallel to the eighth flat surface P8. Through holes 34d, 35d, 36c, 37b and 38 are formed in the first spacer 41.

In the mold 9, the through hole 16 is configured by the through hole of the die 10, the through hole 34a of the first plate flange 31, the through hole 34b of the first spacer 41, the through hole 34c of the second plate flange 32, and the through hole 34d of the second spacer 42.

The first resin supply path 11, the second resin supply path 12, the third resin supply path 13, and the fourth resin supply path 14 described above are configured by a combination of through holes and/or grooves provided in the die 10, the first plate flange 31, the first spacer 41, the second plate flange 32, and the second spacer 42.

The first resin supply path 11 includes a flow path (first flow path) configured by the through hole 35a of the first plate flange 31, the through hole 35b of the first spacer 41, the through hole 35c of the second plate flange 32, and the through hole 35d of the second spacer 42; and a flow path that is configured by the first groove 112 of the first plate flange 31, and connects the through hole 16 and the through hole 35a (first flow path) with the first flat surface P1 of the die 10. The flow path configured by the first groove 112 is a flow path that is provided in a portion within a predetermined range from a connection point between the first resin supply path 11 and the through hole 16, and allows the resin to flow in a direction parallel to the plane orthogonal to the central axis Ax of the through hole 16.

The second resin supply path 12 includes a flow path (second flow path) configured by the through hole 36a of the first spacer 41, the through hole 36b of the second plate flange 32, and the through hole 36c of the second spacer 42; and a flow path that is configured by the second groove 122 of the first plate flange 31, and connects the through hole 16 and the through hole 36a (second flow path) of the first spacer 41 with the fourth flat surface P4 of the first spacer 51. The flow path configured by the second groove 122 is a flow path that is connected to the through hole 16 on the end 17a side of the through hole 16 relative to the connection point between the first resin supply path 11 and the through hole 16, and allows the resin to flow in a direction parallel to the plane orthogonal to the central axis Ax of the through hole 16 in a portion within a predetermined range from a connection point between the second resin supply path 12 and the through hole 16.

The third resin supply path 13 includes a flow path (third flow path) configured by the through hole 37a of the second plate flange 32 and the through hole 37b of the second spacer 42; and a flow path configured by the third groove 132 of the second plate flange 32 and connecting the through hole 16 and the through hole 37a (third flow path) with the fifth flat surface P5 of the first spacer 41. The flow path configured by the third groove 132 is a flow path that is connected to the through hole 16 on the end 17a side of the through hole 16 relative to the connection point between the second resin supply path 12 and the through hole 16, and allows the resin to flow in a direction parallel to the plane orthogonal to the central axis Ax of the through hole 16 in a portion within a predetermined range from a connection point between the third resin supply path 13 and the through hole 16.

The fourth resin supply path 14 has a flow path (fourth flow path) configured by the through hole 38 of the second spacer 42; and a flow path configured by the fourth groove 142 of the second plate flange 32, and connecting the through hole 16 and the through hole 38 (fourth flow path) with the eighth flat surface P8 of the second spacer 42. The flow path configured by the fourth groove 142 is a flow path that is connected to the through hole 16 on the end 17a side of the through hole 16 relative to the connection point between the fourth resin supply path 14 and the through hole 16, and allows the resin to flow in a direction parallel to the plane orthogonal to the central axis Ax of the through hole 16 in a portion within a predetermined range from the connection point between the fourth resin supply path 14 and the through hole 16.

Hereinafter, a flexible tube extrusion molding method using the flexible tube producing apparatus 100 will be described with reference to FIGS. 3A and 3B. In the following description, the hardness is higher in order of the first resin, the second resin, the third resin and the fourth resin, and an example in which resins are supplied to the through hole 16 of the mold 9 in the order from the resin having the lowest hardness will be described.

First, the control device 20 opens the first valve 21, closes the second valve 22, the third valve 23, and the fourth valve, and supplies the first resin extruded from the first extruder 1 to the through hole 16 of the mold 9 through the first resin supply path 11. The surface of the braided wire 6 is coated with the first resin by drawing out the braided wire 6 inserted into the through hole 16 from the extrusion port (the end 17b of the through hole 16) while feeding the first resin to the mold 9.

Next, the control device 20 opens the second valve 22, closes the first valve 21, the third valve, and the fourth valve, and supplies the second resin extruded from the second extruder 2 to the through hole 16 of the mold 9 through the second resin supply path 12. Immediately after the resin supplied to the mold 9 is switched from the first resin to the second resin, the first resin remains in the through holes 16, so that the outer layer tube 26 coating the braided wire 6 has a portion formed of the mixed resin of the first resin and the second resin (shaded portion in FIG. 3B). Moreover, part of the resin in the first groove 112 is pulled out into the through hole 16 by the flow of the second resin. However, in the present embodiment, a portion of the first resin supply path 11 in a portion within a predetermined range from a connection point to the through hole 16 is formed parallel to the plane orthogonal to the central axis Ax of the through hole 16. Therefore, the amount of the first resin that flows into the through hole 16 after switching can be reduced compared to the case of using a conical mold such as in WO2005/120804. Therefore, the length of the portion formed of the mixed resin of the first resin and the second resin can be shortened, and the flexible tube 7 can be produced which can be sharply bent at the connecting portion between the portion made of the first resin and the portion made of the second resin.

Thereafter, similarly, the control device 20 opens the third valve 23, closes the first valve 21, the second valve 22, and the fourth valve, and supplies the third resin extruded from the third extruder 3 to the through hole 16 of the mold 9 through the third resin supply path 13. Next, the controller 20 opens the fourth valve, closes the first valve 21, the second valve 22, and the third valve 23, and supplies the fourth resin extruded from the fourth extruder 4 to the through hole 16 of the mold 9 through the fourth resin supply path 14. By controlling in this way, as shown in FIG. 3B), it is possible to form the outer layer tube 26 having a portion made of the first resin, a portion made of the second resin, a portion made of the third resin, and a portion made of the fourth resin in order, and whose hardness changes stepwise. As with the first groove 112, the second groove 122 and the third groove 123 are formed along a plane orthogonal to the central axis Ax. Therefore, the amount of the second resin that flows into the through holes 16 after switching from the second resin to the third resin and the amount of the third resin that flows into the through holes 16 after switching from the third resin to the fourth resin can be reduced.

As described above, by using the mold 9 according to the present embodiment, when switching the resin to be extruded onto the surface of the braided wire 6, the length of the portion mixed with the resin before and after switching can be shortened. As a result, it is possible to produce a flexible tube 7 that can be bent sharply (bent with a large curvature) at the three hatched portions shown in FIG. 3B. Moreover, in the mold 9 according to the present embodiment, the resin is supplied in a direction orthogonal to the central axis Ax of the through hole 16, i.e., in the radial direction of the braided wire 6, from flow paths formed by the first groove 112, the second groove 122, the third groove 132, and the fourth groove 142. In this case, the injection pressure of the resin is applied in the radial direction of the braided wire 6, and the molten resin for forming the outer layer tube 26 can reach the inner layer tube 28, so that the close adhesion of the outer layer tube 26 with respect to the braid 27 can also be improved.

In the above embodiment, an example in which the outer layer tube 26 is extrusion molded while switching between four types of resin has been described, but the following modifications are also possible according to the number of bendable portions.

Figure 8A:
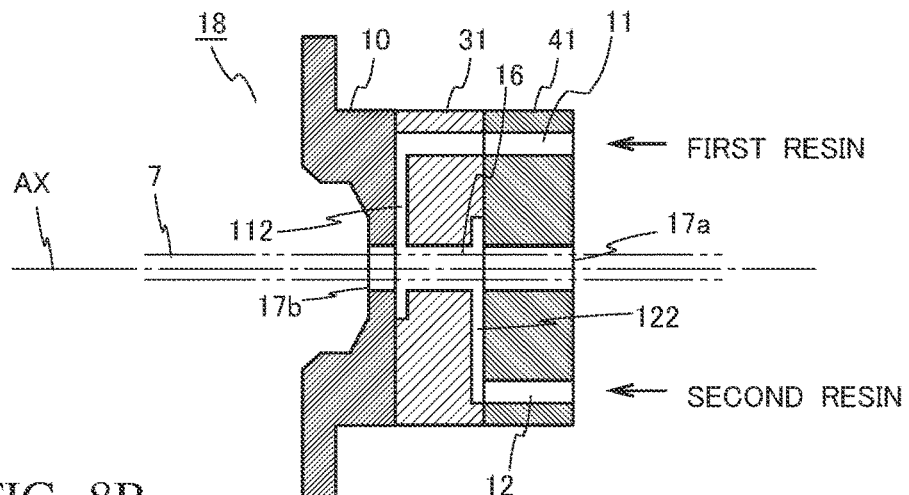
FIG. 8A is a schematic view of a mold according to Modification 1.
Figure 8B:
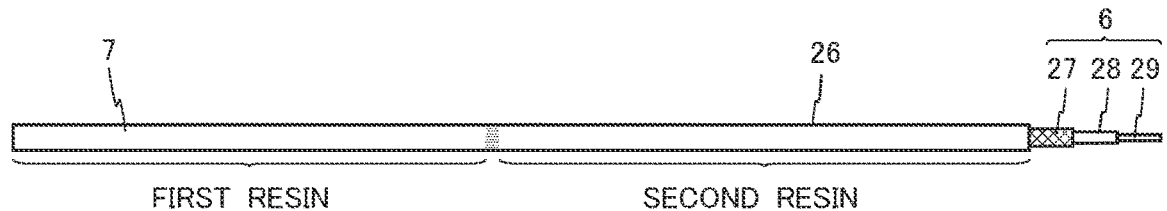
FIG. 8B is a schematic view of a flexible tube according to Modification 1.

FIG. 8A is a schematic view of a mold according to Modification 1, and FIG. 8B is a schematic view of a flexible tube according to Modification 1.

A mold 18 shown in FIG. 8A is configured by a die 10, a first plate flange 31 and a first spacer 41. The mold 18 has a through hole 16, a first resin supply path 11 and a second resin supply path 12. Since the configuration of each member and the resin supply path is the same as that described above, repeated description will be omitted. When configuring a flexible tube producing apparatus using the mold shown in FIG. 8A, the third extruder, the fourth extruder, the third valve, and the fourth valve can be omitted.

When the flexible tube 7 is extrusion molded by switching the resin supplied to the mold 18 shown in FIG. 8A from the first resin to the second resin, the flexible tube 7 having one bendable portion can be produced as shown in FIG. 8B.

Figure 9A:
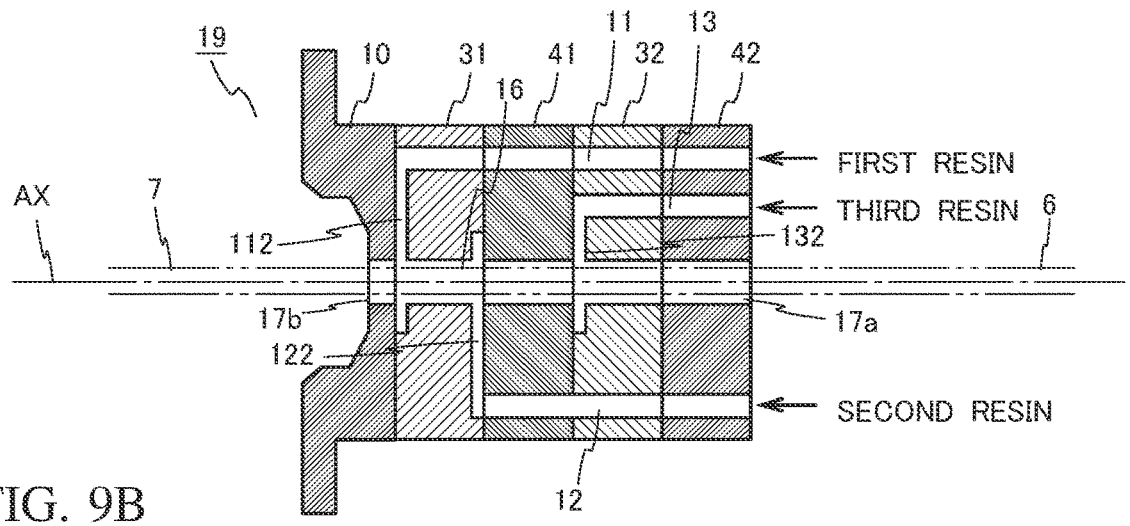
FIG. 9A is a schematic view of a mold according to Modification 2.
Figure 9B:
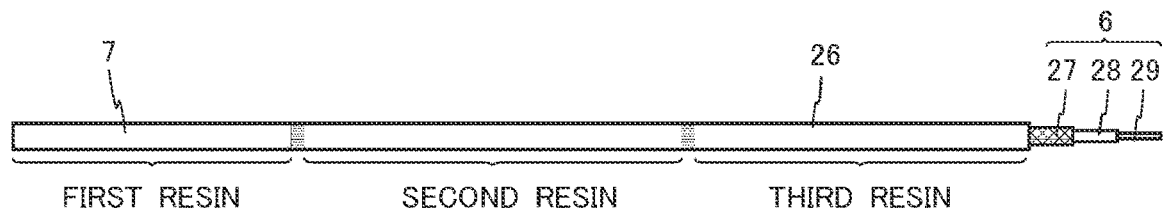
FIG. 9B is a schematic view of a flexible tube according to Modification 2.

FIG. 9A is a schematic view of a mold according to Modification 2, and FIG. 9B is a schematic view of a flexible tube according to Modification 2.

A mold 19 shown in FIG. 9A is obtained by omitting the fourth resin supply path 14 from the mold 9 shown in the above embodiment. The mold 19 can be configured using the second plate flange 32 without the fourth groove 142 shown in FIG. 6B and the second spacer 42 without the through hole 38 shown in FIGS. 7A and 7B. When configuring a flexible tube producing apparatus using the mold shown in FIG. 9A, the fourth extruder and the fourth valve can be omitted.

When the flexible tube 7 is extrusion molded by switching the resin supplied to the mold 19 shown in FIG. 9A in the order of the first resin, the second resin, and the third resin, the flexible tube 7 having two bendable portions can be produced as shown in FIG. 9B.

The configuration of the first to fourth resin supply paths shown in the above embodiment is an example, and the first to fourth resin supply paths do not necessarily pass through the mold in parallel with the through holes through which the braid wires pass. The positions of the upstream end portions of the first to fourth resin supply paths may be appropriately changed according to other configurations of the flexible tube producing apparatus.

The present invention can be used as an apparatus for producing flexible tubes such as catheter shafts used for producing medical catheters and tubes used for endoscopes, and the like.

Although the present invention has been described in detail, the foregoing description is merely illustrative of the invention in all respects and is not intended to limit its scope. It goes without saying that various modifications and variations can be made without departing from the scope of the invention.

What is claimed is:

1. A mold for extrusion molding a flexible tube, comprising:
   a linear through hole through which a braided wire inserted from one end is drawn out from the other end;
   a first resin supply path connected to the through hole, a part of the first resin supply path being parallel to a plane orthogonal to the central axis of the through hole in a portion within a predetermined range from a connection point to the through hole; and
   a second resin supply path connected to the through hole on the one end side of the through hole relative to the connection point between the first resin supply path and the through hole, a part of the second resin supply path being parallel to the plane in a portion within a predetermined range from a connection point to the through hole, wherein
   the mold is configured by integrating
      a die including the other end of the through hole and having a first flat surface parallel to the plane on the one end side of the through hole relative to the other end,
      a flat first plate flange having a second flat surface in close contact with the first flat surface of the die and a third flat surface parallel to the second flat surface, and
      a flat first spacer having a fourth flat surface in close contact with the third flat surface,
   the first resin supply path is configured by
      a first flow path penetrating the first plate flange and the first spacer and extending parallel to the through hole, and
      a first groove provided in the first plate flange and forming the part of the first resin supply path connecting the through-hole and the first flow path between the first flat surface and the first groove,
   and the second resin supply path is configured by
      a second flow path penetrating the first spacer and extending parallel to the through hole, and
      a second groove that is provided in the first plate flange and forms the part of the second resin supply path that connects the through hole and the second flow path with the fourth flat surface.

2. The mold according to claim 1, comprising a third resin supply path connected to the through hole at the one end side of the through hole relative to the connection point between the second resin supply path and the through hole, a part of the third resin supply path being parallel to the plane in a portion within a predetermined range from a connection point to the through hole, wherein
   the first spacer has a fifth flat surface parallel to the fourth flat surface,
   the mold further comprises:
      a flat second plate flange having a sixth flat surface in close contact with the fifth flat surface and a seventh flat surface parallel to the sixth flat surface; and
      a flat second spacer having an eighth flat surface in close contact with the seventh flat surface, and
   the third resin supply path is configured by
      a third flow path penetrating the second plate flange and the second spacer and extending parallel to the through hole, and
      a third groove provided in the second plate flange and forming the part of the third resin supply path connecting the through hole and the third flow path with the fifth flat surface.

3. A flexible tube producing apparatus, comprising:
   a mold;
   a first extruder that supplies a first resin to the mold;
   a second extruder that supplies a second resin different from the first resin to the mold;
   a first valve provided between the mold and the first extruder to control the supply of the first resin; and
   a second valve provided between the mold and the second extruder to control the supply of the second resin, wherein
   the mold includes:
      a linear through hole through which a braided wire inserted from one end is drawn out from the other end;
      a first resin supply path connected to the through hole, a part of the first resin supply path being parallel to a plane orthogonal to the central axis of the through hole in a portion within a predetermined range from a connection point to the through hole; and
      a second resin supply path connected to the through hole on the one end side of the through hole relative to the connection point between the first resin supply path and the through hole, a part of the second resin supply path being parallel to the plane in a portion within a predetermined range from a connection point to the through hole, wherein
   the mold is configured by integrating
      a die including the other end of the through hole and having a first flat surface parallel to the plane on the one end side of the through hole relative to the other end,
      a flat first plate flange having a second flat surface in close contact with the first flat surface of the die and a third flat surface parallel to the second flat surface, and
      a flat first spacer having a fourth flat surface in close contact with the third flat surface,
   the first resin supply path is configured by
      a first flow path penetrating the first plate flange and the first spacer and extending parallel to the through hole, and a first groove provided in the first plate flange and forming the part of the first resin supply path connecting the through-hole and the first flow path between the first flat surface and the first groove, and the second resin supply path is configured by
- a second flow path penetrating the first spacer and extending parallel to the through hole, and
- a second groove that is provided in the first plate flange and forms the part of the second resin supply path that connects the through hole and the second flow path with the fourth flat surface.

4. The flexible tube producing apparatus according to claim 3, comprising:
- a third extruder that supplies a third resin different from at least one of the first resin and the second resin to the mold; and
- a third valve provided between the mold and the third extruder to control the supply of the third resin, wherein the mold has a third resin supply path connected to the through hole at the one end side of the through hole relative to the connection point between the second resin supply path and the through hole, a part of the third resin supply path being parallel to the plane in a portion within a predetermined range from a connection point to the through hole, the first spacer has a fifth flat surface parallel to the fourth flat surface, the mold further includes:
- a flat second plate flange having a sixth flat surface in close contact with the fifth flat surface and a seventh flat surface parallel to the sixth flat surface; and
- a flat second spacer having an eighth flat surface in close contact with the seventh flat surface, and the third resin supply path is configured by
- a third flow path penetrating the second late flange and the second spacer and extending parallel to the through hole, and
- a third groove provided in the second plate flange and forming the part of the third resin supply path connecting the through hole and the third flow path with the fifth flat surface.

* * * * *